United States Patent
Das et al.

(10) Patent No.: US 10,601,640 B1
(45) Date of Patent: Mar. 24, 2020

(54) ENRICHED SELF-HEALING FOR CLOUD PLATFORMS

(71) Applicant: Accenture Global Solutions Limited, Dublin (IE)

(72) Inventors: Jagaran Das, Durgapur (IN); Rizwan Khan, Kolkata (IN); Biju Radhakrishnan, Kolkata (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/421,165

(22) Filed: May 23, 2019

(51) Int. Cl.
H04L 12/24 (2006.01)
(52) U.S. Cl.
CPC ........ H04L 41/0654 (2013.01); H04L 41/069 (2013.01); H04L 41/0613 (2013.01); H04L 41/0636 (2013.01); H04L 41/16 (2013.01)
(58) Field of Classification Search
CPC . H04L 41/0823; H04L 41/0896; H04L 41/12; H04L 43/08
See application file for complete search history.

(56) References Cited

U.S. PATENT DOCUMENTS

| | | | | |
|---|---|---|---|---|
| 2006/0041659 | A1* | 2/2006 | Hasan | H04L 41/0631 |
| | | | | 709/224 |
| 2013/0229914 | A1* | 9/2013 | Suerbaum | H04W 24/02 |
| | | | | 370/229 |
| 2014/0269364 | A1* | 9/2014 | Knapp | H04L 41/0823 |
| | | | | 370/252 |
| 2017/0134237 | A1* | 5/2017 | Yang | H04L 41/0816 |
| 2018/0174067 | A1* | 6/2018 | Spiro | G06F 17/5009 |
| 2018/0206135 | A1* | 7/2018 | Chow | H04L 41/5009 |
| 2018/0314742 | A1* | 11/2018 | Taropa | G06F 16/2474 |
| 2019/0014023 | A1* | 1/2019 | Gupta | H04L 43/08 |
| 2019/0020497 | A1* | 1/2019 | Wang | G06F 16/9574 |
| 2019/0334957 | A1* | 10/2019 | Davis | H04L 65/60 |

* cited by examiner

*Primary Examiner* — Will W Lin
(74) *Attorney, Agent, or Firm* — Brinks Gilson & Lione

(57) ABSTRACT

An applied intelligence framework may receive log information descriptive of a cloud computing stack. The applied intelligence framework may generate a stack token. The stack token may include a computer resource node representative a computer resource of the cloud computing stack. The applied intelligence framework may access, from an ontology repository, a diagnosis instruction. The diagnosis instruction may determine a fault based on at least one of the log parameters. The applied intelligence framework may execute the diagnosis instruction to determine the fault. The applied intelligence framework may append, to the stack token, a fault node representative of the fault. The applied intelligence framework may query an ontology repository based on the stack token to identify a resolution identifier. The applied intelligence framework may append, to the stack token, a resolution node. The applied intelligence framework may determine, based on stack token and the applied ontology repository, a resolution to the fault.

18 Claims, 4 Drawing Sheets

ENRICHED SELF-HEALING FOR CLOUD PLATFORMS

TECHNICAL FIELD

This disclosure relates to fault management in cloud computing stacks and, in particular, to automated diagnosis and remediation of faults in single or multi-cloud environments.

BACKGROUND

Current approaches to fault diagnosis and remediation in cloud computing lack an independent framework to diagnose and/or remediate errors based on information technology (IT) knowledge sources and/or historical remediation attempts. Subject matter experts, information technology service management (ITSM) systems, and/or other knowledge sources may provide a rich source of historical information for diagnosing and remediating faults. While these knowledge sources are useful for IT administrators who manually intervene, cloud-clouding environments lack an automated self-healing approach that is enriched by historical information and IT knowledge sources.

BRIEF DESCRIPTION OF THE DRAWINGS

The embodiments may be better understood with reference to the following illustrations and description. The components in the figures are not necessarily to scale. Moreover, in the figures, like-referenced numerals designate corresponding parts throughout the different views.

DETAILED DESCRIPTION

Figure 1:
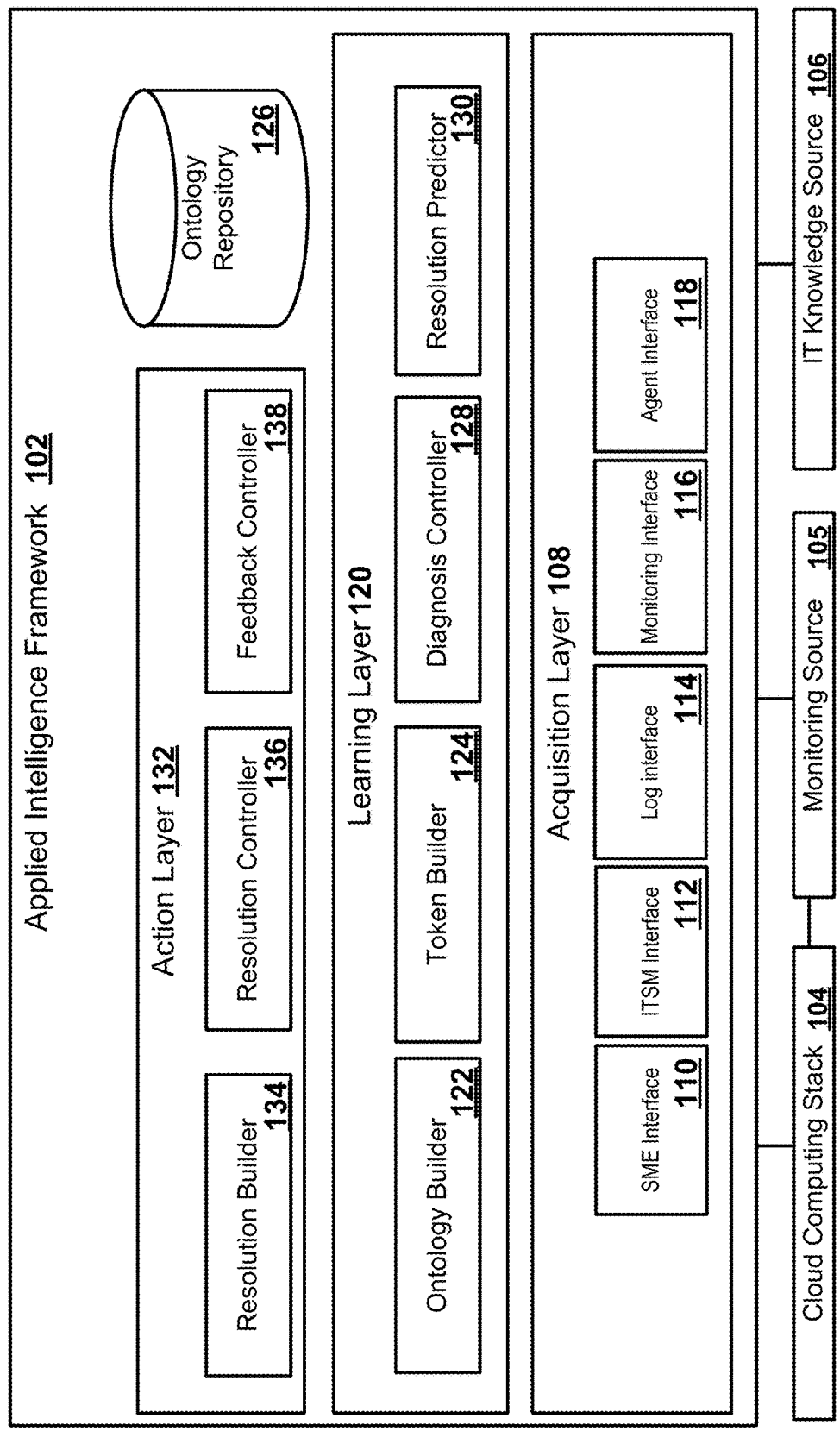
FIG. 1 illustrates a first example of a system.

The system and methods described herein may provide self-healing enriched by one or more knowledge sources and feedback from interaction across one or more cloud environments. The applied intelligence framework may receive log information descriptive of one or more computer resources of a cloud computing stack. The applied intelligence framework may extract, from the log information, log parameters. The log parameters may include a computer resource identifier corresponding to a computer resource and information indicative of operation of the computer resource. The applied intelligence framework may generate a stack token. The stack token may include a computer resource identifier representative of the computer resource. The applied intelligence framework may access, from an ontology repository, a diagnosis instruction. The diagnosis instruction may be configured to determine a fault based on at least one of the log parameters. The applied intelligence framework may execute the diagnosis instruction to determine the fault. The applied intelligence framework may append, to the stack token, a fault identifier representative of the fault. The applied intelligence framework may query an ontology repository based on the stack token to identify a resolution identifier representative of a resolution to the fault. The applied intelligence framework may append, to the stack token, the resolution identifier. The applied intelligence framework may determine, based on stack token, a resolution instruction configured to communicate with the computer resource. The applied intelligence framework may execute the resolution instruction to resolve the fault.

One example of a technical advancement achieved by the systems and methods described below may be that the applied intelligence framework may receive information from information technology management system (ITMS) tools, websites, subject matter experts, and other knowledge sources to determine diagnosis and remediation steps. The applied intelligence framework may store the information in an ontology repository based on a graph data structure. The applied intelligence framework may generate stack tokens representative of tools, errors, and log information associated with a cloud computing stack. The stack token may be enriched with data stored in the ontology repository. The applied intelligence framework may identify, based on the enriched stack token, diagnosis instructions and/or remediation instructions tailored for a particular cloud computing stack.

Another example of a technical advancement achieved by the system and methods described below may be that the applied intelligence framework may update the ontology repository based on results of attempted resolutions. For example, applied intelligence framework may remove or deprecate resolution information associated with unsuccessful resolution attempts.

Another example of a technical advancement achieved by the system and methods described herein is that the applied intelligence framework may be distributed across a global and local level. For example, separate cloud computing environments may each have an instance of a local applied intelligence framework that performs (or attempts to perform) localized diagnosis and self-healing. The local applied intelligence frameworks may communicate with a global applied intelligence framework for supplemental diagnosis and resolution information.

Additional technical advancements, efficiencies, and improvements are made evident by the systems and methods described herein.

FIG. 1 illustrates a first example of a system 100. The system 100 may include an applied intelligence framework 102. The applied intelligence framework 102 may receive log data generated by a cloud computing stack 104 and/or a monitoring source 105.

The cloud computing stack 104 may include computer resources that operate within a cloud environment. A computer resource may include an identifiable physical or virtual component, or set of components within a computer system. The computer resource may include hardware, software, or a combination of hardware and software. For example, the computer resources may include a physical machine, a virtual machine, a clustered group of physical and/or virtual machines, security monitoring frameworks, governance frameworks, application monitoring frameworks, operating systems, network devices, etc.

The monitoring source 105 may include a service that monitors the cloud computing stack 104, and/or computer resources included therein. The monitoring service 105 may evaluate log data generated by the cloud computer stack. The monitoring service 105 may generate additional log data indicative of proper operation of the cloud computing stack 104. Alternatively or in addition, the monitoring source 105 may receive monitoring criteria that establishes conditions one or more error or fault. The monitoring source 105 may generate notifications to signal detection of faults. Examples of the monitoring source 105 may include NAGIOS, AMAZON CLOUD WATCH, and/or other suitable monitoring sources.

The cloud computing stack 104, or computer resources included therein, may generate log data. The log data may include operation information descriptive of operation of the cloud computing stack 104 and/or one or more computer resources therein. Table 1 describes various examples of log data.

TABLE 1

| | Log parameters |
|---|---|
| Performance Log | Log information descriptive of the allocation of computer resources including, for example, CPU allocation, memory allocation, network traffic, throughput, latency, thread counts, process counts, information descriptive of computer resource allocation. Performance logs may include hardware monitoring logs; |
| Security Log | Log information descriptive of credential access to computer resources including, for example, log in/log out events. |
| Activity Logs | Log information descriptive of activities performed by one or more computer resource. For example, activity log may include application logs; operating system logs; vender logs; etc. |
| Error Logs | Log information descriptive of errors information, warning information, or other information indicative of an error or abnormality. |
| Monitoring Logs | Log information generated by am monitoring source included in the cloud computing stack or generated external from the cloud computing stack. |

In some examples, the applied intelligence framework 102 may receive ontology data from an IT knowledge source 106. Ontology data may include resolution data, diagnosis data, and computer resource information. Resolution data may include information indicative of a resolution to a problem. For example, the resolution data may represent actions to resolve the problem. Alternatively or in addition, the resolution data may include instructions to resolve the problem. In some examples, the instruction may include machine executable instructions or computer processor executable instructions. Alternatively or in addition, the instructions may include actions previously performed by, for example, a subject matter expert to resolve a problem.

Diagnosis data my include criteria, instructions and/or associations, to classify log information as a fault. Alternatively or in addition, the diagnosis data may include descriptions of a fault. For example, the diagnosis data may include information that describes a fault, a cause of the fault, and/or an effect of the fault. Alternatively or in addition, the diagnosis data may include data that that identifies the computer resources affected by the fault.

Computer resource information may include information descriptive of a computer resource. For example, the computer resource may include model information, version information, compatibility information, etc. In some examples, the computer resource information may include instructions for interacting with a computer resource or a type of computer resource. For example, the computer resource information may include application programming interface definitions, data formats, and communication protocol information.

In some examples, the IT knowledge source 106 may store or provide access to user input from subject matter experts, machine learning models, and/or knowledge repositories. For example, the IT knowledge source 106 may include an IT service management (ITSM) system, such as SERVICE DESK, that tracks problems and actions taken to resolve problems. In another example, the IT knowledge source 106 may include web pages, repositories, and/or any other knowledgebase that stores or provides resolution information, diagnosis information, and/or computer resource information. In some examples, the IT knowledge source 106 may receive query parameters to identify resolution information. For example, the IT knowledge source may include error information, error codes, log data, extracted portions of log data, computer resource identifiers, descriptions of computer resources (e.g. model number, version number, type etc) and/or other information associated with a computer resource.

Figure 2:
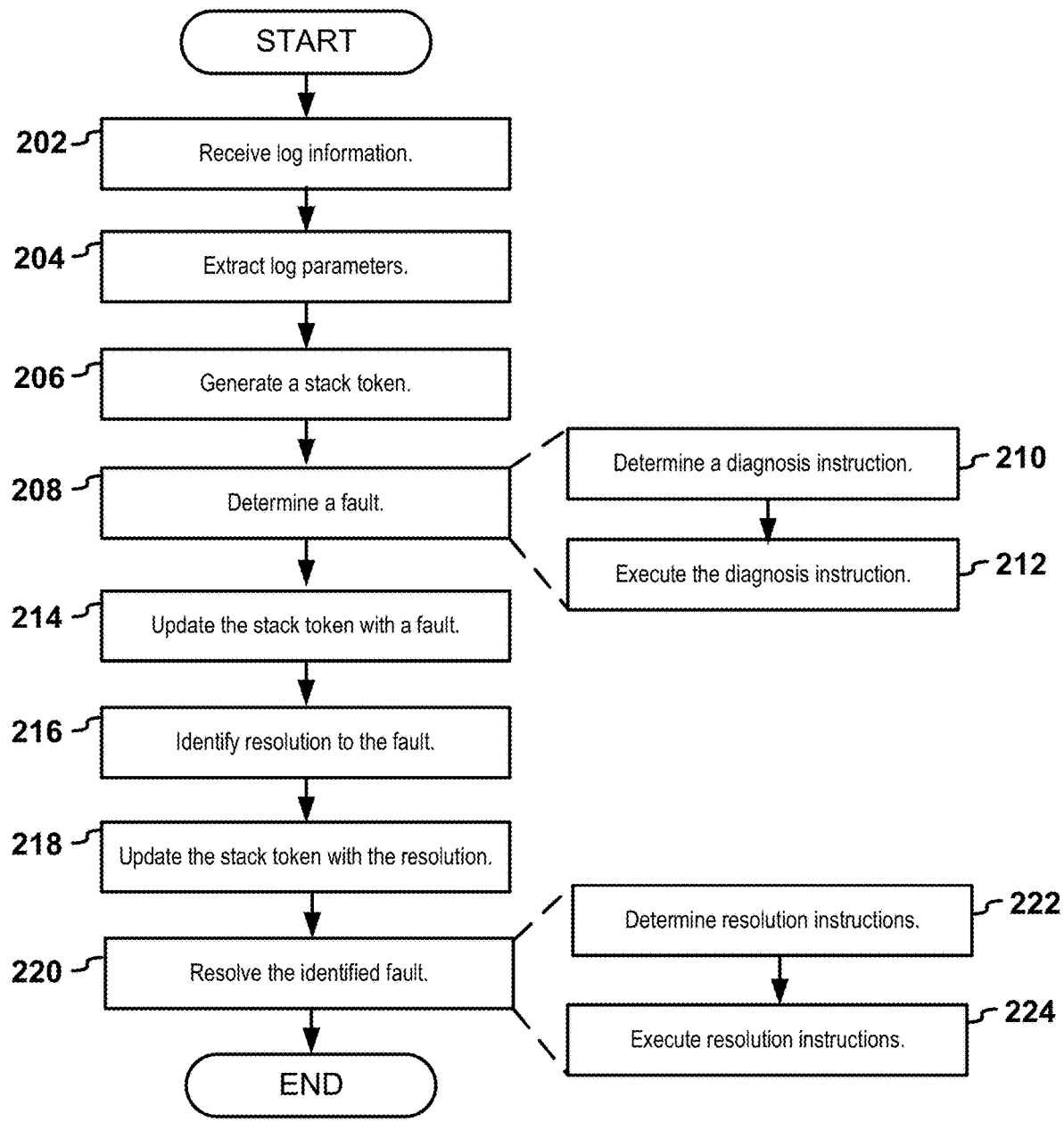
FIG. 2 illustrates a flow diagram for logic of a system.

FIG. 2 illustrates a flow diagram for logic of the system 100. The following discussion refers to both FIG. 1 and FIG. 2.

Data Acquisition Layer

The applied intelligence framework 102 may include an acquisition layer 108. The acquisition layer 108 may include one or more knowledge interfaces. The knowledge interfaces may include interfaces for receiving data from one or more cloud computing stack 104, IT knowledge source 106, monitoring source 105, or other sources. For example, the knowledge interfaces may include a subject matter expert (SME) interface 108. The SME interface 108 may receive resolution data, diagnosis data and/or computer resource information data from users involved in managing the operation of the cloud computer stack 104, including, for example, IT professionals and administrators. In some examples, the SME interface 108 may generate an interactive view with a control that receives input. The input may include diagnosis instruction(s), resolution instruction(s), computer resource identifier(s) etc.

Alternatively or in addition, the knowledge interfaces may further include an ITSM interface 112. The ITSM interface 112 may communicate with one or more ITSM system to receive the resolution data, diagnosis data, and/or computer resource information.

The knowledge interfaces may include a log interface 114. The log interface 114 may receive log data from one or more cloud computing stack and/or computer resource. For example, one or more computer resource in the cloud computing stack 104 may generate the log data. In some examples, the log data may be provided over various communication channels and originate from various cloud computing stack or computer resources therein. The log interface 114 may receive multiple streams of log data transiting from various sources in real time, or near real time. Alternatively or in addition, the log aggregation controller may receive the log data in batch (via log files, for example).

The knowledge interfaces may further include a monitoring interface 116. The monitoring interface 116 may receive log data from monitoring the monitoring source 105, such as NAGIOS, ELK, or other stack monitoring services. In some examples, the monitoring services may provide diagnosis, or partial diagnosis, of log information, including for example, fault identification.

The knowledge interfaces may further include an agent interface 118. The agent interface 118 may communicate with one or more applied intelligence agents that are local to the cloud computing stack 104. Additional description of an applied intelligence agent is discussed in reference to FIG. 3.

The knowledge interfaces may receive information via message broker, HTTP calls, FTP, inter-process communication, and/or any other suitable communication channel or channel(s). In some examples, the knowledge interfaces may include an application programming interface (API). Alternatively or in addition, the knowledge interfaces may include threads, processes, services, and/or hardware that accesses the IT knowledge source 106, the cloud computing stack 104, and/or the monitoring source 105.

During operation, the acquisition layer 108 may receive log data (202). For example, log interface 114, the monitoring interface 116, and/or the agent interface 118 may receive the log data. Alternatively or in addition, the acquisition layer 108 may tag the log data with supplemental information including, for example, environment identifiers, tenant identifiers, and/or time stamp information.

Learning Layer

The system 100 may further include a learning layer 120. The learning layer 120 may include an ontology builder 122. The ontology builder 122 may store ontology data in an ontology repository 126. In some examples, the ontology builder 122 may generate a knowledge graph. The knowledge graph may include a graph data structure comprising one or more nodes connected by one or more edges. The nodes my represent computer resource information, diagnosis information and/or resolution information. The edges may represent mapped relationships between the nodes. By way of example, the knowledge graph may include a computer resource node, a fault node, a resolution node, and/or a result node. The computer resource node may be representative of a computer resource, or type of computer resource. The compute resource node may include (or be tagged) with various information including, for example a computer resource identifier, version information, model information, etc. The fault node may represent a particular fault or type of fault. The fault node include (or be tagged with) a fault identifier, rules or instructions for identifying the fault, and information descriptive of the fault. The resolution node may represent a resolution to a problem. The resolution may include, or be tagged with, a resolution identifier, resolution instructions for performing the resolution. The results node may include, for example, result information descriptive of the outcome of an attempted resolution. For example, the results node may indicate success or failure of an attempted resolution.

The ontology builder 122 may append ontology information to the ontology repository 126. For example, as information from one or more IT knowledge sources and/or cloud computing stacks are received, the ontology builder 122 may append one or more nodes to the knowledge graph and/or establish relationships between the nodes.

The learning layer 120 may include a token builder 124. The token builder 124 may extract log parameters from the log data (204). Log parameters may include pieces of information included in the log data. In some examples, the token builder 124 may apply natural language processing (e.g. regular expression matching, chunking, sentence recognition, phrase recognition, etc.) to extract pieces of information from the log data. The extracted pieces of log data may include identifiers of computer resources (e.g. application identifiers, internet protocol (IP) addresses, etc.), time stamp information, tenant information, and/or other information traditionally included in the log data.

By way of example, Table 2 illustrates an example of log data and parameters extracted from the log data:

TABLE 2

| Log Data |
| --- |
| Log Data |

ABC-109878, ABC-dev-aws-rhel-123456, Dlake-DSE-6.7, 1546440621, "Cassandra.NoHostAvailableException: None of the hosts tried for query are available (tried: 'node-ip':9042)"

| Log Parameters | |
| --- | --- |
| Parameter Name | Extracted Value |
| Client | ABC Inc. |
| Resource Identifier | ABC-109878 |
| Environment | Development Environment |
| Cloud Vendor | AWS cloud |
| OS type | RHEL |
| Database Service | Cassandra version 6.7 |
| Error occurrence time | 1546440621 |
| Error Text | Cassandra.NoHostAvailableException: None of the hosts tried for query are available. |
| Resource Description | This resource fetches information about this client and environment from central client repository and validates and verifies the information. |

The token builder 124 may generate a stack token (206). A stack token may include a data structure comprising mappings between computer resource(s), log parameter(s), fault(s), resolution(s) and/or result(s) that are included in or generated by the cloud computing stack 104. In some examples, the stack token may be arranged in a graph data structure. For example, the stack token may include one or more nodes interconnected by one or more edges. The nodes may represent or describe one or more computer resources, log parameter(s), fault(s), resolution(s) and/or result(s). The edges may represent relationships between the nodes.

In some examples, the token builder 124 may generate a stack token with a graph including computer resource node(s). The computer resources node(s) may represent computer resources included in the cloud stack 104 and/or computer resources configured to monitor the cloud stack 104 (i.e. the monitoring source 105). The token builder 124 may associate log data, ontology data, fault information, resolution information, result information and/or other relevant information with computer resource nodes.

The learning layer 120 may further include a diagnosis controller 128. The diagnosis controller 128 may determine a fault (208). For example, the diagnosis controller 128 may identify a fault based on the log parameter(s) or other information included in the stack token. In some examples, the diagnosis controller 128 may compare extracted log parameters with historical log parameters. The historical log parameters may be associated with fault identifiers. For example, the ontology repository 126 may include associations between the historic log parameters and fault identifiers.

Alternatively or in addition, the diagnosis controller 128 may verify a fault identified by the cloud stack 104 and/or the monitoring source 105. For example, one or more computer resource may generate log data indicative of a fault. In some examples, the log data may be received from multiple sources with conflicting fault information. For example, a first monitoring service may indicate a fault while a second monitoring service may incite no fault. The diagnosis controller 128 may determine or verify whether a reported fault is valid or erroneous.

A fault may include a state indicative of erroneous or anomalous operation. The fault may correspond to a historical state, a current state, or a predicted future state. The fault may indicate that the one or more computer resources are not, or are soon will be not, operating within tolerance. The fault may be classified by a fault identifier. The fault identifier may be a unique identifier for a particular fault.

In some examples, the diagnosis controller 128 may determine (or verify) the fault (or the fault identifier) based on information included in the stack token. For example, the diagnosis controller 128 may extract the information (e.g. computer resource identifiers, fault identifiers, and other log parameters) from the stack token. The extracted information may be included in a query to the ontology repository 126 and/or one or more IT knowledge sources. In some examples, the extracted information may include information from the nodes and/or edges of a graph included in the stack token. The information extracted from the stack token may be submitted in a query to the ontology repository 126 and/or one or more IT knowledge sources to determine a fault or to determine instruction(s) for identifying/verifying a fault.

In various examples, the diagnosis controller 128 may determine a diagnosis instruction (or multiple diagnosis instructions) to identify one or more faults (210). A diagnosis instruction may include rules that determine or verify a fault or faults. The diagnosis instruction may include instructions to evaluate log information generated by computer resources to determine the fault. For example, the diagnosis instruction may include thresholds, ranges, and/or logic to determine the fault or potential fault. In some examples, the diagnosis instruction may classify the fault. For example, the diagnosis instruction may receive log parameters, or other information related to one or more computer resources, and then determine a fault identifier.

In some examples, the diagnosis instruction may be inference. For example, the diagnosis instruction may be generated by subject matter experts and input into the ontology repository 126. The applied intelligence framework 102 may provide an interactive view with a graphical user interface control, such as a text field, that enables a subject matter expert to insert the instruction. Alternatively or in addition, the interactive view may enable the diagnosis instruction to be associated with various computer resources, fault identifiers, and/or other log parameters in order to build searchable associations with the diagnosis instruction. In some examples, the interactive view may display information, such as nodes, from a stack token. The interactive view may enable selection the information from the stack token and one or more fault, or diagnosis instructions to identify the fault.

In some examples, the diagnosis instruction(s) may evaluate information included in the stack token. For example, the diagnosis instruction may evaluate computer resource identifier(s), log parameter(s), and/or other information descriptive of a computer resource or operation of the computer resource to determine a fault or faults. By way of example, the stack token may include a graph. As previously discussed, the graph may include one or more nodes and/or edges. The nodes and/or edges may be associated with tags that identify the type of information represented by the node. The graph may be parsed in order to identify one or more computer resource parameter or a particular type of log parameter that is associated with one or more diagnosis instruction in the ontology repository 126.

The ontology repository 126 may store multiple diagnosis instructions. In some examples, many of the diagnosis instruction say not be applicable to the cloud computing stack 104, computer resource, and/or stack token. The diagnosis controller 128 may filter the diagnosis instructions to select a portion of the available diagnosis instructions. For example, the diagnostic controller may select one or more diagnosis instruction from the ontology repository 126 in response to the one or more diagnosis instruction being associated with log parameter, computer resource identifier, log parameter, or other information included in the stack token.

In some examples, the diagnosis controller 128 may access a diagnosis model trained based on historical stack tokens. For example, the diagnosis model may include machine-learned associations between diagnosis instruction(s) and historical stack tokens (or information included therein). In some examples, the historical stack tokens may be associated with fault identifiers, and other log parameters. In some examples, the historical stack tokens may be provided as training data to the diagnosis model. The diagnosis controller 128 may receive a historical stack token and train the diagnosis model. Once trained, the diagnosis model may infer fault identifiers based on log parameters and/or other information included in a stack token.

The diagnosis controller 128 may execute one or more diagnosis instructions to identify one or more faults (212). In some examples, a portion of the diagnosis instructions may indicate a fault while other may indicate normal operation. Alternatively or in addition, the diagnosis instructions may determine one or more fault identifier. In some examples, the diagnosis instructions may cause additional information to be accessed from the cloud computing stack 104, monitoring application configured to monitoring the cloud compute stack and/or one or more IT knowledge sources.

The diagnosis controller 128 may update the stack token with the diagnosed fault (214). For example, the diagnosis controller 128 may add a fault identifier to the stack token. In examples where the stack token includes a graph, the diagnosis controller 128 may generate a fault node representative of the fault. The diagnosis controller 128 may append the fault node to the graph. The diagnosis controller 128 may associate the fault node with one or more other nodes, such as a computer resource nodes representative of a computer resource that caused or contributed to the identified fault.

The learning layer 120 may further include a resolution predictor 130. The resolution predictor 130 may identify a resolution for an identified fault (216). A resolution may include an action (or set of actions) for resolving a fault (or faults). The resolution may be associated with a resolution identifier. A resolution identifier may include an identifiable classification of a resolution. For example, the resolution identifier may uniquely identify a particular resolution among a plurality of resolutions.

In some examples, the ontology repository 126 may store resolutions and/or resolution identifiers. The resolution identifiers may be associated with other information, including, for example, historical log data and/or historical stack token information acquired from one or more cloud computing stacks. For example, the IT ontology repository 126 may include a mapping between a resolution identifier, a computer resource identifier, and/or a fault identifier.

The ontology repository 126 and/or the IT knowledge source 106 may include a query interface where resolution information may be queried based on input parameters. In some examples, resolution predictor 130 may extract information from the stack token to query the resolution repository and/or the IT knowledge source 106. The resolution predictor 130 may generate a query request with information from the stack toking including, for example, a computer resource identifier(s), fault identifier(s), and/or log parameter(s). In some examples, the resolution predictor 130 may select one or more resolution identifier (or resolution instruction) associated with the computer resource identifier, errors codes, error information, log information, and/or other information included in the stack token.

In some examples, the resolution predictor 130 may access a resolution model trained based on historical stack tokens. The resolution model may include a machine learning model that maps a resolution identifier to information included in the stack tokens. For example, the nodes of the historical stack tokens may be mapped to one or more resolution identifier. During inference type, the nodes of a stack token may be extracted and submitted to the resolution model to infer one or more resolution.

Alternatively or in addition, the resolution predictor 130 may perform analysis on a computer resource or group of computer resources to identify a resolution. For example, the resolution predictor 130 may detect fault patterns based on information included in the ontology repository 126.

The resolution predictor 130 may update the stack token with the identified resolution (218). For example, the resolution predictor 130 may add a resolution identifier to the stack token. In examples where the stack token includes a graph, the diagnosis controller 128 may generate a resolution node representative of the resolution. The resolution predictor 130 may map the resolution node with one or more other nodes, such as a computer resource node and/or a fault node.

Action Layer

The applied intelligence framework 102 may further include an action layer 132. The action layer 132 may resolve the identified fault in a cloud computing platform (220). For example, the applied intelligence framework 102 may access information in the stack token to determine the appropriate corrective action to correct or prevent a fault. The action layer 132 may include a resolution builder 134.

The resolution builder 134 may determine a resolution instruction, or multiple resolution instructions (222). The resolution instruction may include a machine executable instruction that causes one or more computer resource to perform an action, or series of action. The action may cause removal or resolution of the one or more identified fault. In some examples, the resolution instruction may include one or more API calls or series of API calls to one or more computing resource of the cloud stack 104. Alternatively, or in addition, the resolution instructions may include parameters, messages, and/or other information that causes one or more cloud computing resource of the cloud stack 104 to operate differently in order to resolve a fault.

In some examples, the resolution instructions may be identified in the ontology repository 126 and/or one or more IT knowledge sources. The ontology repository 126 and/or the IT knowledge source 106 may store the resolution instructions. Alternatively or in addition, the resolution repository and/or the IT knowledge source 106 may store associations between the resolution instructions, the resolution identifier and/or log data, diagnosis data, and/or computer resource information.

The stack token may provide relevant information to select resolution instructions that are specifically tailored for the cloud stack 104 and/or computer resources. For example, multiple cloud computing stacks may exhibit the same or similar faults, but the resolution instructions to resolve the fault may be different for each cloud stack 104. The differences may arise from variations in dependences between computer resources, variations in credentials to access computer resources (e.g. different user names/passwords), variations in computer resource addressing (e.g. different IP addresses), and/or differences between the computer resources (different models, versions, etc.).

Information from the stack token may be extracted to identify resolution instruction(s) compatible for a particular cloud stack. For example, computer resource information, diagnosis information and/or resolution information may be extracted from the stack token. The resolution builder 134 may select, from the ontology repository 126 (or IT knowledge source), resolution instruction(s) that are associated with information (e.g. nodes) of the stack token. For example, the ontology repository 126 may store resolution instructions that may identified based on associations with computer resource identifier(s), the fault identifier(s), resolution identifier(s) and/or other information included in the stack token.

By way of example, a first operating system and a second operation system may be different types of operating system (e.g. LINUX and WINDOWS SERVER). After identifying a fault, a resolution may be identified which dictates that an operating system needs to be restarted. Restarting the operating system is applicable to both types of operating systems. The resolution repository and/or the IT knowledge source 106 may store two sets of resolution instructions associated with the resolution—a first set of instructions to restart LINUX and a second set of instructions to restart WINDOWS SERVER. A tack token may include a computer resource identifier that indicates the operating system is the first operating system (e.g. LINUX) and may access the first set of resolution instructions. The first set of resolution instructions may include, for example, "/sbin/shutdown-r now".

The action layer 132 may include a resolution controller 136. The resolution controller 136 may execute identified resolution instructions (224). In some examples, the resolution instruction may be accessed from the stack token. The resolution controller 136 may perform (e.g. execute) the resolution instruction. Alternatively or in addition, the resolution controller 136 may communicate with the cloud computing stack 104 to cause the cloud computing stack 104 (or cloud environment that hosts the cloud computing stack 104) to execute the resolution instruction.

The action layer 132 may further include a feedback controller 138. The feedback controller 138 may track the results of resolving a fault. In some examples, the feedback controller 138 may generate a fault resolution result. The fault resolution result may indicate the success, failure, and/or outcome of an attempted resolution. Alternatively or in addition, the fault resolution result may include return codes, status codes another information that may indicate the success or failure of the attempted resolution.

In some examples, the feedback controller 138 may update the stack token with the resolution results. In examples where the stack token includes a graph data structure, the feedback controller 138 may append a result node to the stack token. The result node may represent the feedback results. The result node may be mapped to a resolution node via an edge.

In some examples, the feedback controller 138 may enrich the ontology repository 126 based on the stack token. For example, the feedback controller 138 may append the stack token, or a portion thereof, in the ontology repository 126. In some examples, the stack token and the ontology repository may include respective information that follows a graph data structure. The feedback controller 138 may identify nodes of the resolution repository that match (or correspond to) nodes of the stack token. The feedback controller insert, into the ontology repository, additional nodes associated with the matching nodes that were not previously included in the ontology repository.

Alternatively or in addition, the feedback controller 138 may update the ontology database based on the resolution results. In some examples, the resolution results may indicate that a particular resolution, or resolution instructions, resulted in an unsuccessful resolution. In response, the resolution builder 134 may determine that the resolution is no longer applicable for future faults. Alternatively or in addition, the resolution builder 134 may determine that the resolution instruction associated with the negative resolution results is no longer applicable. Positive resolution results associated with resolutions (or resolution instructions) may boost a confidence value associated with the resolution (or resolution instruction). For example, resolution information may be ranked and/or selected according to the confidence value. The confidence value may be measurement of number of favorable outcomes.

The system 100 may be implemented with additional, different, or fewer components than illustrated. Each component may include additional, different, or fewer components. The logic illustrated in the flow diagram of FIG. 2 and described herein may include additional, different, or fewer operations than illustrated. The operations illustrated may be performed in an order different than illustrated.

Example

Various aspects of the applied intelligence platform 102 may be embodied in the following non-limiting example. The cloud stack 104 may include one or more of the following components: 1. a extract, transform, load (ETL) component (e.g. —Talend/Informatica); 2. a clustered data lake components (e.g. Cloudera Hadoop, Cassandra etc.); 3. an analytics component (e.g. —Alteryx); and 4. a dashboard component (e.g. Tableau).

The cloud stack 104, and/or the monitoring source 105 may generate the following log data:

"Cassandra.NoHostAvailableException: None of the hosts tried for query are available (tried: 'node-ip': 9042) at Cassandra.Tasks.TaskHelper.WaitToComplete (Task task, Int32 timeout) at Cassandra.Tasks.TaskHelper.WaitToComplete[T](Task "1 task, Int32 timeout) at Cassandra.ControlConnection.Init( ) at Cassandra.Cluster.Init( )'"

The acquisition layer 108 may clean the data to yield the following log data:

ABC-109878, ABC-dev-aws-rhel-123456, Dlake-DSE-6.7, 1546440621, "Cassandra.NoHostAvailableException: None of the hosts tried for query are available (tried: 'node-ip':9042)"

Alternatively or in addition, the acquisition layer 108 may append a time stamp to the log data. To signify when the log data was received.

The token builder 124 may parse the cleaned log data. For example, the token builder 124 generate log parameters comprising "Resource Identifier: ABCD-109878, Client: ABC Inc., Environment: Dev, Cloud Service Provider: AWS Cloud, Operating System: Red-Hat, Error Time: 1546443421."

The token builder 124 may generate a stack token. The stack token may include a graph data structure with one or more cloud resource nodes of the cloud stack. For example, the cloud resource node for the clustered data lake may be tagged with the resource identifier "ABCD-109878". The stack token may include additional nodes for one or more of the log parameters.

In some examples, the token builder 124 may acquire additional information from the ontology repository 126 (or the IT knowledge source 106). For example, additional information may be associated with the computer resource identifier, the client identifier, and/or any other log parameter(s). Alternatively or in addition, the token builder 124 may acquire additional log data from other sources, such as the monitoring source 105. For example, the token builder may acquire CPU, Network, and or other performance data for a time window defined by a threshold time before and/or after the time stamp generated by the acquisition layer. The token builder 124 may append the additional log data to the stack token.

The diagnosis controller 128 may parse the stack token to extract the computer resource nodes, log parameters, and/or other information included in the stack token. For example, the diagnosis controller 128 may identify a node corresponding to a faulty computer resource. Parsing the stack token may reveal a potential fault in the clustered data lake.

The diagnosis controller 128 may identify one or more diagnostic rules. In the present example, the diagnostic rules may include logic represented by the pseudocode described in Table 3.

TABLE 3

| Example Pseudo Code for Diagnostic Logic |
|---|
| if (all graph nodes = OK),<br>check VM CPU utilization % (CPU %) in same time stamp T1<br>If CPU % > threshold in T1, assert CPU = NOT_NORMAL_T1<br>Check VM CPU utilization % in current time<br>If CPU % >= threshold, assert CPU_NORMAL_CURRENT<br>Append a fault node to the stack token with INFO = CPU_SURGE_T1 |

The resolution predictor 130 may parse the stack token to reveal the fault node with the fault identifier "CPU_SURGE_T1." The resolution predictor 130 may query the ontology repository 126 and/or the IT knowledge source 106 based on the fault identifier and/or other information included in the stack token. For example, the resolution predictor 130 may generate a query request with the following parameters:

Tool=DSE 6.7
Error=Node Down
CPU=Normal
Output=Check and restart DSE Agent in the host The resolution predictor 130 may identify, from the resolution repository 126 and/or the IT knowledge source 106, resolution information. The resolution information may include, for example, "Check and restart DSE Agent in the host." The resolution predictor 130 may append a resolution node to the stack incident token. The resolution node may include the resolution information.

The resolution builder 134 may receive and parse the stack token. The resolution builder 134 may determine that the resolution includes "Check and restart DSE Agent in the host". The resolution builder 134 may identify resolution instructions based on resolution node and/or other information included in the stack token. The resolution instruction may include instructions to restart the clustered data lake component of the cloud stack 104. The resolution controller 136 may execute the resolution instruction and determine a fault resolution result. The resolution controller 136 may append a result node to the stack token. The feedback controller 138 may update the ontology repository based one or more nodes included in the stack token.

Figure 3:
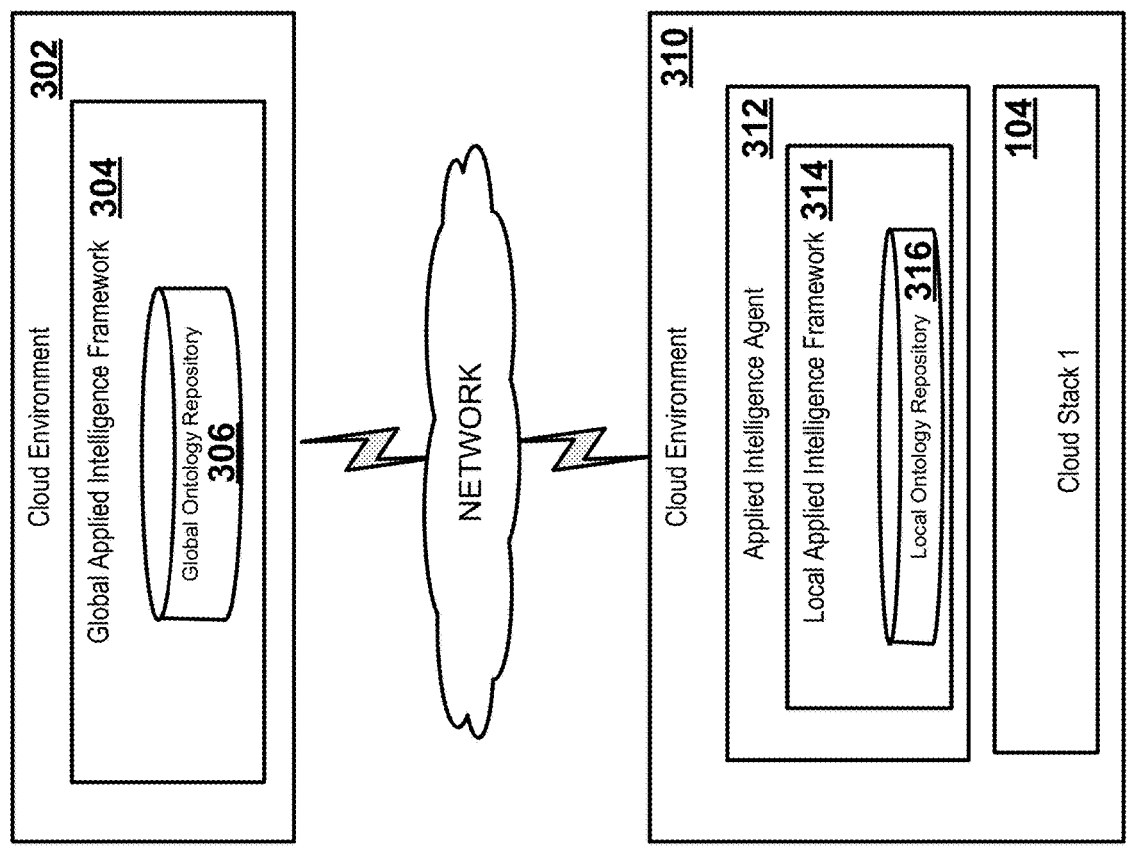
FIG. 3 illustrates a second example of a system.

FIG. 3 illustrates a third example of the system 100. The system may include one or more cloud environments. In some examples, the analytics and healing performed by applied intelligence framework 102 described in reference to FIGS. 1 and 2 may be shared between the multiple cloud environments.

By way of example, the system 100 may include a host cloud environment 302. The host cloud environment 302 may include a cloud environment that is configured to perform fault diagnosis and/or healing of multiple cloud stacks. The host cloud environment may include a global applied intelligence framework 304. The global applied intelligence framework 304 may include an example of the applied intelligence framework 102 described in reference to FIGS. 1 and 2.

The global applied intelligence framework 304 may include a global ontology repository 306. The global ontology repository 306 may store log data, computer resource data, diagnosis data, resolution data, results data associated with multiple cloud stacks. In some examples, the global ontology repository 306 may store information derived from stack tokens corresponding to multiple cloud stacks.

The system 100 may include the client cloud environment 310 (or multiple client cloud environments). The client cloud environment 310 may include an applied intelligence agent 312. The applied intelligence agent 312 may include a computer resource that communicates with the cloud stack 104 locally within the client cloud environment 310. For example, the applied intelligence agent 312 may collect log information from the cloud computing stack 104. Alternatively or in addition, the applied intelligence agent 312 may forward the log data to the host cloud environment 302. In some examples, the applied intelligence agent 312 may execute instructions, such as resolution instructions on the client cloud environment 310 to perform localized self-healing.

In some examples, the applied intelligence agent 312 may include a local applied intelligence framework 314. The local applied intelligence framework 314 may include an instance of an applied intelligence framework that is local to the cloud stack 104, and/or the client cloud environment 310. For example, the local applied intelligence framework 314 may be provisioned in the same client cloud environment 310 as the cloud stack 104. Alternatively or in addition, the local applied intelligence framework 314 may communicate with the cloud stack 104 within the same local area network or virtual private network. In some examples, the local applied intelligence framework 314 may be provisioned common accounts in a cloud service provider, such as AWS, AZURE, or other cloud service provider.

The local applied intelligence framework 314 may include the acquisition layer 108, the learning layer 120, the action layer 132, and/or any subcomponent thereof, which is previously described in reference to FIG. 1 and FIG. 2. In some examples, the local applied intelligence framework 314 may include a local ontology repository 316. The local ontology repository 316 may include log information, resolution information, diagnosis information and/or computer resource information that is derived from the cloud stack 104 of the client cloud environment 310. The local applied intelligence framework 314 may receive log information generated (or communicated by) by the cloud stack 104, but not other cloud stacks provisioned in other client cloud environments. Accordingly, the local applied intelligence framework 314 may perform fault diagnosis and fault resolution to only the cloud stack.

In some examples, the local applied intelligence framework 314 may determine or verify a fault based on one or more diagnosis instructions identified by the local applied intelligence framework 314. For example, the local applied intelligence framework 314 may access the local ontology repository 316 to determine one or more diagnosis instructions or faults. In some circumstances, the local applied intelligence framework 314 may be unable to determine a fault and/or a diagnosis instruction associated with particular log parameters received from the cloud stack 104. Alternatively, the local applied intelligence framework 314 may detect a fault, but have limited or no information regarding the fault. For example, the log parameter may indicate that an error is raised, but the local applied intelligence framework 314 may have no information to classify and/or respond to the fault. The local applied intelligence framework 314 may communicate with the global applied intelligence framework 304 to diagnose faults based on information included in the global ontology repository 306 and/or other IT knowledge sources accessible by the global applied intelligence framework 304.

In some examples, the local applied intelligence framework 314 may generate the stack token. The local applied intelligence framework 314 may communicate the stack token to the global applied intelligence framework 304 for further enrichment based on information included in the global ontology repository 306 and/or other IT knowledge sources accessible by the global applied intelligence framework 304, but not the local applied intelligence framework 314. For example, the local applied intelligence framework 314 may create nodes, and the global applied intelligence framework 304 may append additional nodes to the fault token).

The local applied intelligence framework 314 may attempt to identify a resolution. For example, the local applied intelligence framework 314 may access the local ontology repository 316 to identify one or more resolutions. If a resolution is identified, the local applied intelligence framework 314 may append a resolution identifier to the stack token. If the resolution is not identified, the AIP agent may communicate with the central platform to perform additional analysis based on the global ontology repository 306.

In some examples, the global applied intelligence framework 304 with enrich the stack token with a resolution identifier and send the stack token back to the local applied intelligence framework 314. The local applied intelligence framework 314 may locally determine resolution instructions. For example, the local ontology repository 316 may include resolution instructions that are specifically tailored for the cloud stack and/or the cloud environment.

Figure 4:
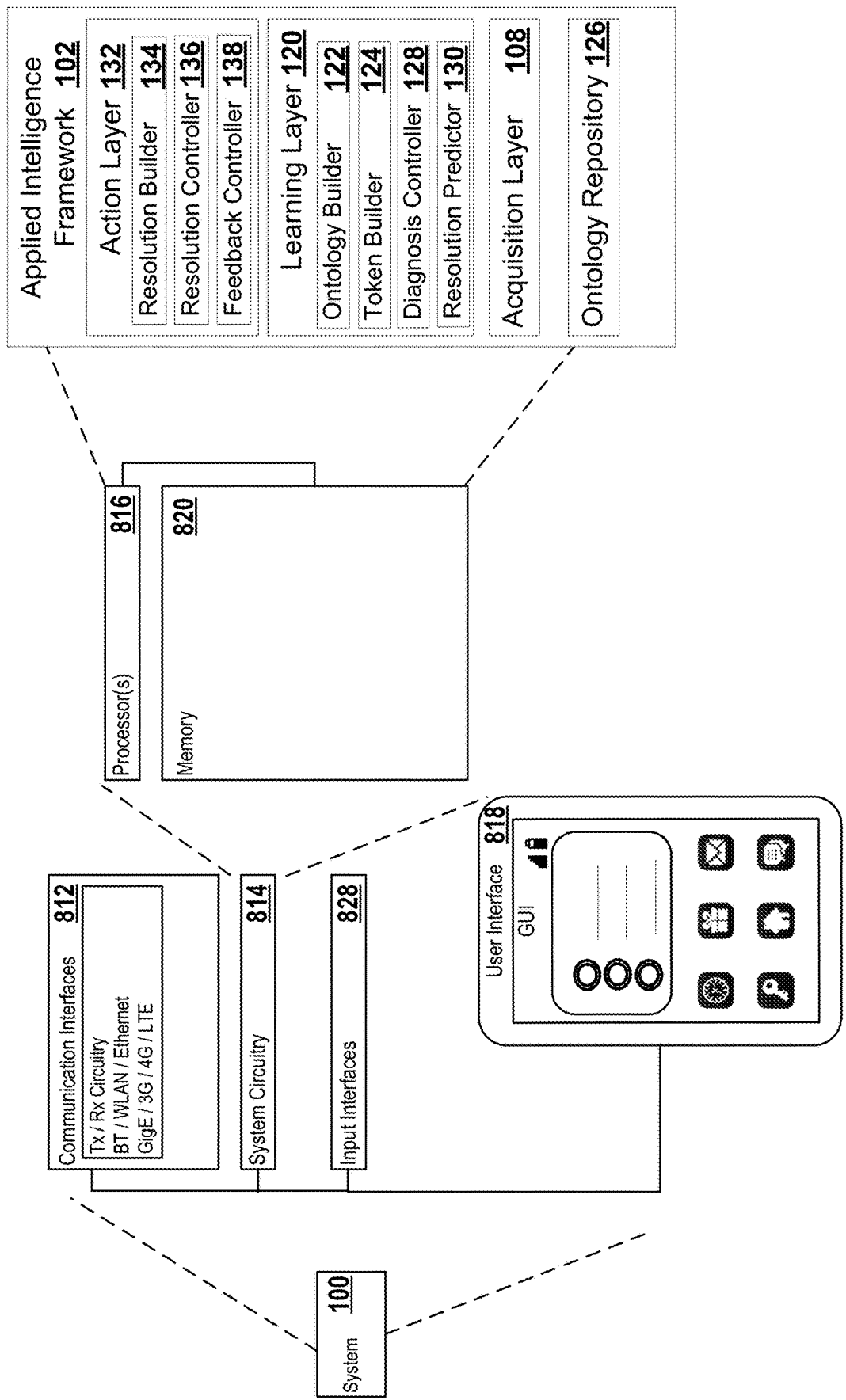
FIG. 4 illustrates a third example of a system.

FIG. 4 illustrates a fourth example of the system 100. The system 100 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations of the applied intelligence framework 102, the action layer 132, the learning layer 120, the ontology repository 126, the ontology builder 122, the token builder 124, the diagnosis controller 128, the resolution predictor 130, the resolution builder 134, the resolution controller 136, the feedback controller 138, the system 100, and/or any component or sub-component therein. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of the operations of the applied intelligence framework 102, the action layer 132, the learning layer 120, the ontology repository 126, the ontology builder 122, the token builder 124, the diagnosis controller 128, the resolution predictor 130, the resolution builder 134, the resolution controller 136, the feedback controller 138, and/or the system 100. Alternatively or in addition, the memory may include any other component or sub-component of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many different ways. In some examples, the system 100 may be implemented with one or more logical components. For example, the logical components of the system 100 may be hardware or a combination of hardware and software. The logical components may include the operations of the applied intelligence framework 102, the action layer 132, the learning layer 120, the ontology repository 126, the ontology builder 122, the token builder 124, the diagnosis controller 128, the resolution predictor 130, the resolution builder 134, the resolution controller 136, the feedback controller 138, the system 100, and/or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The invention claimed is:

1. A method, comprising
receiving, by a cloud computing environment in communication with a cloud computing stack, log information descriptive of one or more computer resources of the cloud computing stack;
extracting, from the log information, log parameters, the log parameters comprising a computer resource identifier corresponding to a computer resource and information indicative of operation of the computer resource;
generating a stack token, the stack token comprising the computer resource identifier representative of the computer resource;
accessing, from an ontology repository, a diagnosis instruction, the diagnosis instruction configured to determine presence of a fault on the cloud computing stack based on at least one of the log parameters;
executing the diagnosis instruction to determine the presence of the fault;
appending, to the stack token, a fault identifier representative of the fault;
querying the ontology repository based on the stack token to identify a resolution identifier, the resolution identifier representative of a resolution to the fault;
appending, to the stack token, the resolution identifier;
determining, based on the stack token and a confidence metric, a resolution instruction executable by the cloud computing stack to communicate with the computer resource identified in the stack token and respond to the fault after the fault has occurred;
communicating the resolution instruction to the cloud computing stack to cause the cloud computing stack to execute the resolution instruction;
receiving, from the cloud computing stack, a fault resolution result generated by the cloud computing stack, the fault resolution result indicative of the fault being successfully resolved or unsuccessfully resolved in response to execution of the resolution instruction by the cloud computing stack; and
calibrating the confidence metric based on the fault resolution result.

2. The method of claim 1, further comprising:
appending, to the stack token, the fault resolution result.

3. The method of claim 2, wherein the ontology repository comprises a knowledge graph, the knowledge graph comprising a plurality of nodes and edges, the method further comprising:
enriching the knowledge graph by appending, to the knowledge graph, information from the stack token, the information from the stack token comprising the fault identifier, the resolution identifier, the computer resource identifier, the fault resolution result or a combination thereof.

4. The method of claim 1, wherein accessing, from the ontology repository, the diagnosis instruction further comprises:
selecting the diagnosis instruction in response to the diagnosis instruction being mapped to at least one of the log parameters in the ontology repository.

5. The method of claim 1, wherein querying the ontology repository based on the stack token to identify the resolution identifier further comprises:
extracting, from the stack token, the computer resource identifier, a fault identifier indicative of the fault, or a combination thereof;
generating a query request comprising the computer resource identifier, the fault identifier, or any combination thereof;

submitting the query request to the ontology repository; and identifying, in the ontology repository, the resolution identifier based on the query request.

6. The method of claim 1, wherein determining, based on the stack token and the confidence metric, the resolution instruction executable by the cloud computing stack to communicate with the computer resource identified in the stack token and respond to the fault further comprises:

extracting, from the stack token, the resolution identifier and the computer resource identifier;

identifying, in the ontology repository, a plurality of resolution instructions mapped with the resolution identifier, each of the resolution instruction respectively configured to communicate with different corresponding computer resources to respond to the fault; and selecting, from the resolution instructions, the resolution instruction based on the computer resource identifier of the stack token.

7. The method of claim 1, wherein the stack token comprises a graph data structure, wherein the graph data structure comprises a computer resource node, a fault node, and a resolution node, wherein the computer resource node comprises the computer resource identifier, the fault node comprises the fault identifier, and the resolution node comprises the resolution identifier.

8. A system comprising:

a cloud computing environment in communication with a plurality of cloud computing stacks, the cloud computing environment comprising a processor, the processor configured to:

receive log information descriptive of one or more computer resources of a cloud computing stack included among the cloud computing stacks;

extract, from the log information, log parameters, the log parameters comprising a computer resource identifier corresponding to a computer resource of the cloud computing stack and information indicative of operation of the computer resource;

generate a stack token, the stack token comprising a computer resource identifier representative of the computer resource;

access, from an ontology repository, a diagnosis instruction, the diagnosis instruction configured to determine an occurrence of a fault by the cloud computing stack based on at least one of the log parameters;

execute the diagnosis instruction to determine the occurrence of the fault;

append, to the stack token, a fault identifier representative of the fault;

query an ontology repository based on the stack token to identify a resolution identifier, the resolution identifier representative of a resolution to the fault;

append, to the stack token, the resolution identifier;

determine a resolution instruction based on the stack token and a confidence metric, the resolution instruction being executable by the cloud computing stack to communicate with the computer resource to respond to the fault after the occurrence of the fault;

communicate the resolution instruction to the cloud computing stack to cause the cloud computing stack to execute the resolution instruction and resolve the fault;

receive, from the cloud computing stack, a fault resolution result generated by the cloud computing stack, the fault resolution result indicative of the fault being successfully resolved or unsuccessfully resolved in response to execution of the resolution instruction by the cloud computing stack; and adjust the confidence metric based on the fault resolution result.

9. The system of claim 8, wherein the cloud computing environment is physically remote from the plurality of cloud computing stacks.

10. The system of claim 8, wherein the ontology repository comprises information from a plurality of stack tokens respectively generated by different corresponding cloud computing stacks.

11. The system of claim 8, wherein the processor is further configured to:

append, to the stack token, the fault resolution result.

12. The system of claim 11, wherein the ontology repository comprises a knowledge graph, the knowledge graph comprising a plurality of nodes and edges, wherein the processor is further configured to:

append, to the knowledge graph, information from the stack token, the information from the stack token comprising the fault identifier, the resolution identifier, the computer resource identifier, the fault resolution result, or a combination thereof.

13. The system of claim 8, wherein to access, from the ontology repository, the diagnosis instruction, the processor is further configured to:

select the diagnosis instruction in response to the diagnosis instruction being mapped to at least one of the log parameters in the ontology repository.

14. The system of claim 8, wherein to query the ontology repository based on the stack token to identify the resolution identifier, the processor is further configured to:

extract, from the stack token, the computer resource identifier, a fault identifier indicative of the fault, or a combination thereof;

generate a query request comprising the computer resource identifier, the fault identifier, or any combination thereof;

submit the query request to the ontology repository; and identify, in the ontology repository, the resolution identifier based on the query request.

15. The system of claim 8, wherein to determine, based on the stack token and the confidence metric, the resolution instruction, the processor is further configured to:

extract, from the stack token, the resolution identifier and the computer resource identifier;

identify a plurality of resolution instructions associated with at least one of the computer resource identifier or the resolution identifier;

rank the resolution instructions based on confidence metrics respectively mapped to the resolution instructions; and select the resolution instruction from the ranked resolution instructions.

16. A non-transitory computer readable storage medium comprising computer executable instructions, the computer executable instructions being executable by a processor, the computer executable instructions comprising:

instructions executable by the processor to receive log information descriptive of one or more computer resources of a cloud computing stack;

instructions executable by the processor to extract, from the log information, log parameters, the log parameters comprising a computer resource identifier corresponding to a computer resource and information indicative of operation of the computer resource;

instructions executable by the processor to generate a stack token, the stack token comprising a computer resource identifier representative the computer resource;

instructions executable by the processor to access, from an ontology repository, a diagnosis instruction, the diagnosis instruction configured to determine, based on at least one of the log parameters, a fault is present on the cloud computing stack;

instructions executable by the processor to execute the diagnosis instruction to determine the fault;

instructions executable by the processor to append, to the stack token, a fault identifier representative of the fault;

instructions executable by the processor to query an ontology repository based on the stack token to identify a resolution identifier, the resolution identifier representative of a resolution to the fault;

instructions executable by the processor to append, to the stack token, the resolution identifier;

instructions executable by the processor to determine, based on the stack token and a confidence metric, a resolution instruction executable by the cloud computing stack to communicate with the computer resource to respond to the fault present on the cloud computing stack;

instructions executable by the processor to receive, from the cloud computing stack, a fault resolution result generated by the cloud computing stack, the fault resolution result indicative of successful execution or unsuccessful execution of the resolution instruction by the cloud computing stack; and instructions executable by the processor to adjust the confidence metric based on the fault resolution result.

17. The non-transitory computer readable storage medium of claim 16, wherein the ontology repository comprises a knowledge graph, the knowledge graph comprising a plurality of nodes and edges, wherein the non-transitory computer readable storage medium further comprises:

instructions executable by the processor to extract the computer resource identifier and the fault identifier from the stack token;

instructions executable by the processor to generate a query request comprising the computer resource identifier, the fault identifier, or any combination thereof;

instructions executable by the processor to submit the query request to the ontology repository;

instructions executable by the processor to identify, in the ontology repository, the resolution identifier based on the query request;

instructions executable by the processor to append, to the stack token the fault resolution result; and instructions executable by the processor to append, to the knowledge graph, information from the stack token, the information from the stack token comprising the fault identifier, the resolution identifier, the computer resource identifier, the resolution instruction, the fault resolution result or a combination thereof.

18. The non-transitory computer readable storage medium of claim 16, wherein determining, based on the stack token, the resolution instruction further comprises:

instructions executable by the processor to extract, from the stack token, the resolution identifier and the computer resource identifier; and instructions executable by the processor to select, from the ontology repository, a resolution instruction associated with at least one of the computer resource identifier or the resolution identifier.

* * * * *